United States Patent
Manssour et al.

(10) Patent No.: US 9,949,286 B2
(45) Date of Patent: Apr. 17, 2018

(54) METHOD AND NETWORK EFFICIENCY NODE FOR INCREASED DATA THROUGHPUT IN WIRELESS NETWORKS

(71) Applicant: TELEFONAKTIEBOLAGET L M ERICSSON (PUBL), Stockholm (SE)

(72) Inventors: Jawad Manssour, Seoul (KR); Lars Klockar, Rättvik (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 248 days.

(21) Appl. No.: 14/786,602

(22) PCT Filed: Apr. 26, 2013

(86) PCT No.: PCT/SE2013/050470
§ 371 (c)(1),
(2) Date: Oct. 23, 2015

(87) PCT Pub. No.: WO2014/175800
PCT Pub. Date: Oct. 30, 2014

(65) Prior Publication Data
US 2016/0183291 A1    Jun. 23, 2016

(51) Int. Cl.
| | |
|---|---|
| *H04W 4/00* | (2018.01) |
| *H04W 72/12* | (2009.01) |
| *H04W 28/06* | (2009.01) |
| *H04W 72/04* | (2009.01) |
| *H04L 5/00* | (2006.01) |
| *H04W 72/08* | (2009.01) |
| *H04W 72/00* | (2009.01) |

(52) U.S. Cl.
CPC ....... *H04W 72/1289* (2013.01); *H04L 5/0055* (2013.01); *H04W 28/06* (2013.01);
(Continued)

(58) Field of Classification Search
CPC ............. H04W 72/1289; H04W 28/06; H04W 72/048; H04W 72/085; H04W 72/00;
(Continued)

(56) References Cited

U.S. PATENT DOCUMENTS 8,432,866 B1 * 4/2013 Tapaninen ............ H04L 1/0015
370/252
9,166,661 B2 * 10/2015 Ko ........................ H04L 5/0053
(Continued)

FOREIGN PATENT DOCUMENTS

| EP | 2242303 A2 | 10/2010 |
|---|---|---|
| GB | 2435157 A | 8/2007 |
| WO | 2013019243 A1 | 2/2013 |

OTHER PUBLICATIONS

3GPP TSG RAN WG1 53, R1-081979, Enhancements for LTE-Advanced, Texas Instruments, Kansas City, MO, USA, May 5-9, 2008.
(Continued)

*Primary Examiner* — Rebecca E Song

(57) ABSTRACT

A method, computer program and a network efficiency node in a wireless communications network for enabling increased data throughput to a UE, the method comprising: retrieving information of UE configuration data, receiving an indicator of a first channel capability from the UE, determining a first data transport unit size based on the received indicator of the first channel capability, selecting a second channel capability different than the received indicated first channel capability and limited based on the information of the UE configuration data, determining a second data transport unit size based on the selected second channel capability, and transmitting scheduling information to the UE to use the second data transport unit size, thereby enabling increased data throughput.

23 Claims, 6 Drawing Sheets

(52) U.S. Cl.
CPC ....... *H04W 72/048* (2013.01); *H04W 72/085* (2013.01); *H04W 72/00* (2013.01)

(58) Field of Classification Search
CPC ..... H04W 72/04; H04W 72/12; H04W 72/08; H04L 5/0055; H04L 5/00
USPC .......................................................... 370/329
See application file for complete search history.

(56) References Cited

U.S. PATENT DOCUMENTS

| | | | | |
|---|---|---|---|---|
| 2005/0208973 | A1* | 9/2005 | Iochi | H04W 52/16 455/561 |
| 2009/0010208 | A1* | 1/2009 | Ishizaki | H04L 1/0007 370/328 |
| 2010/0290438 | A1* | 11/2010 | Seok | H04L 1/1819 370/335 |
| 2011/0243008 | A1* | 10/2011 | Kim | H04L 1/1893 370/252 |
| 2012/0051313 | A1* | 3/2012 | Seo | H04L 5/003 370/329 |
| 2013/0033989 | A1* | 2/2013 | Barbieri | H04L 1/0003 370/242 |
| 2013/0215811 | A1* | 8/2013 | Takaoka | H04W 52/367 370/311 |
| 2013/0287132 | A1* | 10/2013 | Taoka | H04B 7/0452 375/267 |

OTHER PUBLICATIONS

3GPP TS 36.213 V12.0.0, 3rd Generation Partnership Project; Technical Specification Group Radio Access Network; Evolved Universal Terrestrial Radio Access (E-UTRA); Physical layer procedures (Release 12), Dec. 2013.

* cited by examiner

METHOD AND NETWORK EFFICIENCY NODE FOR INCREASED DATA THROUGHPUT IN WIRELESS NETWORKS

This application is a 371 of International Application No. PCT/SE2013/050470, filed Apr. 26, 2013, the disclosure of which is fully incorporated herein by reference.

TECHNICAL FIELD

The present disclosure relates generally to a method, node and a computer program performed by a network efficiency node in a wireless communications network for enabling increased data throughput to a UE.

BACKGROUND

There is a desire to optimize and enable as much data throughput as possible in wireless networks. An increasing variety and usage of software applications, demands higher data bandwidth. New radio access technologies area evolving, providing increased bandwidth and increased data throughput. However, the demand on data throughput from the applications and services seems infinite. Examples of such applications and services are electronic messaging, Internet browsing, social networks, locations services, media and/or multimedia services, software maintenance services.

The costs for wireless networks are increasing, both in terms of technology but also in terms of deployment. Wireless networks technology costs both in terms of capital expenditure (CAPEX) as well as in operative expenditure (OPEX). Deploying the networks also brings indirect costs such as getting access to property of radio masts, access to real estate for mounting of antennas and base equipment. It is further a tendency among the general public to limit the amount of radio equipment in the public society.

It is therefore a desire to enable as much data throughput as possible of the wireless networks. Today the access side of the wireless network may be dependent on a UE (User Equipment), that the UE report CSI (Channel State Information), such that the network may adapt the data transmission link between the network and UE.

A problem in determining the maximal data throughput between the UE and the access side of a wireless network is that the procedure for the determination of the maximal data throughput is not completely accurate. An example is that standards specifying how to determine channel quality in a LTE-type (Long Term Evolution) of network does give a UE some room for interpretation of a perceived channel quality. In some cases it might be right, but in some cases the UE may determine the channel quality as better as or worse than it is in reality.

Another problem is that UE's from different vendors may have different basis or procedures for determination of a certain channel quality, i.e. different UE's may determine the channel quality different based on a similar measured CQI (Channel Quality Information). Another problem is that a UE, which report the CSI, may not have the complete information about the network environment. Thus the CSI, which may be seen as historical data, reported by the UE may not be the only or single best basis for determination of the channel quality.

SUMMARY

It is an object of the invention to address at least some of the problems and issues outlined above. It is possible to achieve these objects and others by using a method, node and computer program as defined in the attached independent claims.

According to one aspect, a method is provided performed by a network efficiency node in a wireless communications network for enabling increased data throughput to a UE. The method comprises retrieving information of UE configuration data. The method comprises receiving an indicator of a first channel capability from the UE. The method comprises determining a first data transport unit size based on the received indicator of the first channel capability. The method comprises selecting a second channel capability different than the received indicated first channel capability and limited based on the information of the UE configuration data. The method comprises determining a second data transport unit size based on the selected second channel capability. The method comprises transmitting scheduling information to the UE to use the second data transport unit size, thereby enabling increased data throughput.

It is an advantage to not only measure Channel State Information (CSI) typically measured on the cell-specific reference signals (CRS) transmitted in downlink.

According to another aspect, a network efficiency node in a wireless communications network is provided for enabling increased data throughput to a UE. The node is configured to retrieve information of UE configuration data from an UE database. A communication unit is configured to receive an indicator of a first channel capability from the UE. A determination unit is configured to determine a first data transport unit size based on the received indicator of the first channel capability. A selection unit configured to select a second channel capability different than the received indicated first channel capability and limited based on the information of the UE configuration data. The determination unit configured to determine a second data transport unit size based on the selected second channel capability. The communication unit configured to transmit scheduling information to the UE to use the second data transport unit size, thereby enabling increased data throughput.

According to another aspect, a computer program is provided comprising computer readable code means, which when run in a network efficiency node adopted to enable increased data throughput, causes the network efficiency node adopted to enable increased data throughput to perform the corresponding method.

The above method, node and computer program may be configured and implemented according to different optional embodiments. In one possible embodiment, the indicator of the first channel capability may comprise at least one of: Reference Signal Received Power (RSRP), Hybrid Automatic Repeat Request (HARQ) feedback, Channel Quality Information (CQI), Precoding Matrix Indicator (PMI), and Rank Indicator (RI), wherein the data transport unit size determined by the signal capability is in a LTE-network a Transport Block Size (TBS).

In one possible embodiment, a first rank of the Rank Indicator (RI), indicated by the UE, may be override with a second rank, the second rank different than the first rank indicated by the UE. In one possible embodiment, a Modulation and Coding Scheme (MCS) may be selected such that the second data transport unit size is different than the first data transport unit size. In one possible embodiment, a predetermined number of Acknowledgments (ACK) received from the UE may indicate successful reception of data, wherein the Modulation and Coding Scheme (MCS) may be changed, such that the data transport unit size becomes different than the second data transport unit size.

In one possible embodiment, the Modulation and Coding Scheme (MCS) may be changed such that a Block Error Rate (BLER) value is maintained within a determined interval. In one possible embodiment, the data transport unit size may be increased based on, subsequent received Channel State Information (CSI) determined as acceptable, or that the Block Error Rate (BLER) value is maintained within a determined interval.

In case where the UE is maintaining its BLER target and the second data transport unit size is larger than what the first data transport unit size can support, the network efficiency node keeps using the second rank. The network efficiency node may even exploit the continuous/new CSI sent by the UE to let the outer loop converge faster if desired. That might be useful in case second data transport unit size was not aggressive enough, e.g. due to large gains from reducing transmission power in neighbor cells not captured by the UE's CSI. This may be a faster way to step by step increase the data transport unit size, compared to increase the data transport unit size based on received "ACK"-messages.

In one possible embodiment, a second data transport unit size may be determined which is larger than the first data transport unit size when an indicator of channel quality is above a predetermined threshold by overriding the first rank, and a second data transport unit size may be determined which is smaller than the first data transport unit size when the indicator of channel quality is below a predetermined threshold by overriding the first rank.

In one possible embodiment, the first data transport unit size based on the received indicator of the first channel capability may be selected, and an instruction may be transmitted to the UE to use the first data transport unit size, when receiving a number of Not Acknowledges (NACK) from the UE over a determined time period indicating reception failure of data from the UE (140). In one possible embodiment, the solution may be performed in coordination with reduction of transmission power in a neighboring cell.

In one possible embodiment, the determination of the second data transport unit size may be dependent on the reduction of the of transmission power in a neighboring cell.

In order to fully capture the benefits of muting the neighbor cells, it may be advantageous to estimate the correct rank of the UE, i.e. check if the UE is able to support a higher rank due to reduction of transmission power in the neighbor cell.

Even if a UE reports the correct CSI, some base station algorithms have a behavior that can be missed by the CSI reported by the UE. For instance, in a centralized deployment, i.e. co-located digital units with centralized processing, the network might decide to reduce transmission power downlink in one or several cells in order to improve the performance in other cells. Such a decision of reduction of transmission power may be taken after the UE has measured CSI, therefore may the reduction never be captured by the UE. Therefore it may be an advantage to perform override. Another example is such cases, the rank reported by the UE in the non-reduced cell will not capture the impact of reduction the neighbor cells since CRS is still transmitted even if a cell is reduced.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
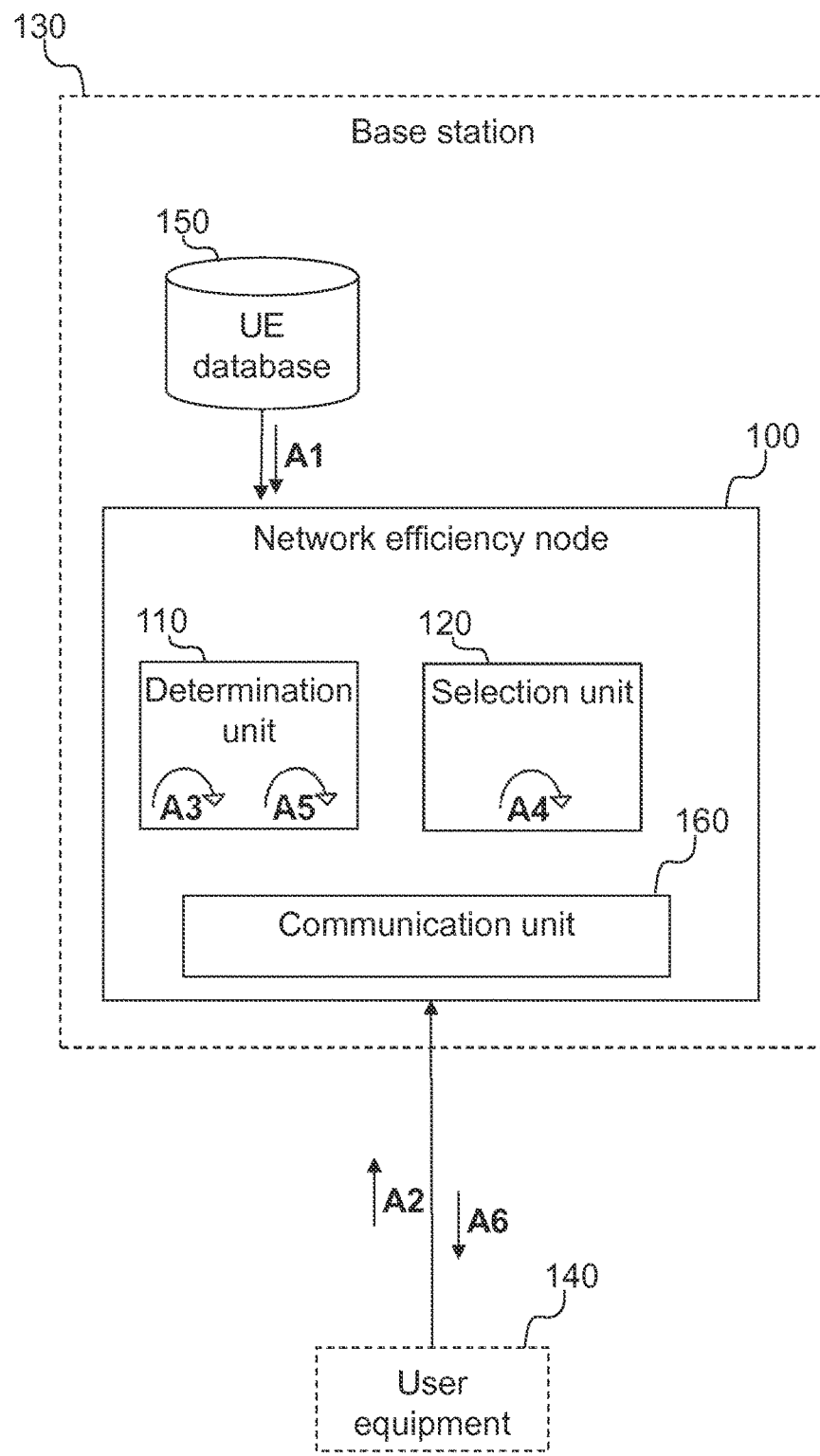
FIG. 1 is a block diagram illustrating the solution, according to some possible embodiments.

Briefly described, a solution is provided to enable higher throughput of data in wireless networks, for example in the access environment in mobile telephony and data networks such as but not limited to, GSM, WCDMA, LTE, or WLAN (Wireless Local Area Networks), WiMAX networks (Worldwide Interoperability for Microwave Access). A UE (User Equipment) may report a channel capability of the network, where the channel capability may include a rank. The rank refers to the maximum number of parallel channels that can be supported on the same radio resources over a radio link. The number of antennas may limit the number of supported channels and the rank may indicate the number of supported channels. Sometimes the reported rank, or the potential rank, may be underestimated by a UE. The rank reported by the UE may be overridden with a different rank by a network efficiency node, such the more data may be transmitted to the UE. In some cases, the rank reported by the UE may be the optimal. In some cases, where a UE has two or four antennas and therefore supporting theoretically two or four channels, the reported rank may be too low and therefore not fully utilizing the access capacity between a base station and a UE. The reported rank may also be too high, which causes re-transmissions and unnecessary load on the network. The access side or central part of the network may sometimes be in a better position to optimize the data throughput, compared to the UE.

Proactive actions may also be taken from the network side, to optimize the throughput, actions which the UE not may be capable to perform.

For example, in centralized radio access network (GRAN) deployments, which are gaining in popularity due to the flexibility that GRAN may provide and the more advanced algorithms GRAN may support. A popular feature that may be enabled or facilitated by GRAN deployments is coordinated scheduling. In all simplicity, coordinated scheduling means that the scheduling of users in several cells may be coordinated, e.g. performed jointly, in order to maximize, e.g. total system throughput or cell-edge throughput. One of the simplest implementations of coordinated scheduling is dynamic point blanking, or muting. In such an implementation, a cell that generates too high interference to users in one or several neighbor cells may be occasionally muted in order to decrease the interference in the neighbor cells and thereby potentially increase their throughput.

Coordinated scheduling may be implemented on cells belonging to the same digitalization unit, or cells from different digitalization units where the digital units are interconnected. An example, in a scenario where radio units may be remotely located, the radio units may be connected to centrally located digitalization units. Radio unit may also be described with the term remote radio unit, or base band unit, not limiting this description to use of other terms.

A challenge today with coordinated scheduling may be capturing of the improvement of channel quality when neighbor cells, also denoted aggressor, are muted. If such improvements are not captured, benefits of muting may not be fully utilized. The herein suggested solution solves some of the challenges with coordinated scheduling.

Link adaptation, through the outer loop, may compensate for a too pessimistic CQI, i.e. if/when the CQI reported by the UE does not capture the improvement due to muting a neighbor cell. However, a parameter that can not be compensated for by the outer loop is the rank. The rank refers to the maximum number of parallel channels that can be supported over a radio link. The rank takes into account not only the channel quality but also the number of antennas at the transmitting and receiving sides. If a too low rank is reported, e.g. rank one instead of rank two, the throughput loss may be up to 50%. That is a reason why it may be desirable to find a method to suitable override the rank reported by the UE.

Below the solution will be described in more detail, starting with FIG. 1. FIG. 1 shows a block diagram illustrating an example of the solution, with a network efficiency node 100, a base station 130 which may comprise the network efficiency node 100, a UE 140, a UE database 150 for storage of UE configuration data. The network efficiency node 100 may comprise a determination unit 110 for e.g. determination of the size of a data transport unit size, a selection unit 120 for e.g. selection of channel capabilities, and a communication unit 160 for e.g. communication with the UE 140.

Figure 2:
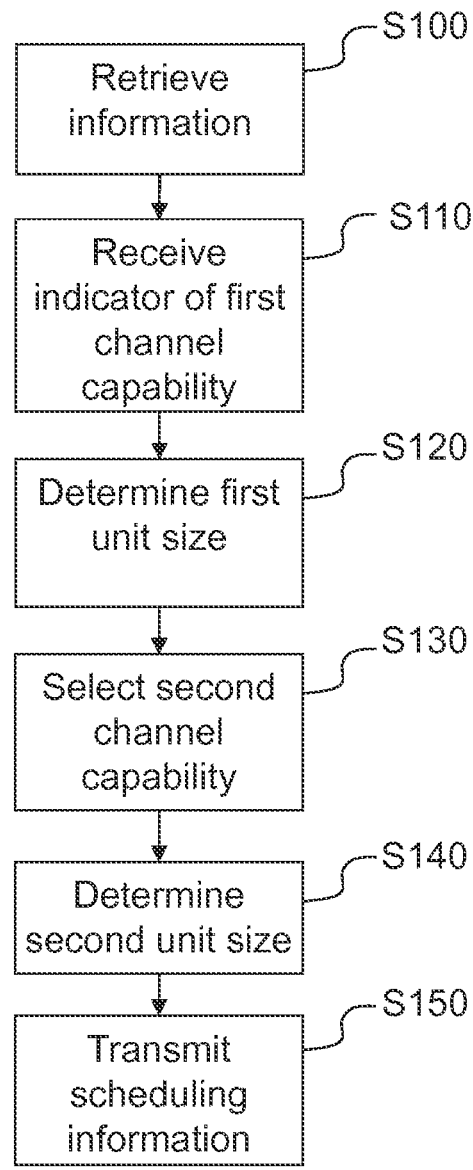
FIG. 2 is a flow chart illustrating a procedure in a network efficiency node, according to some possible embodiments.

According to an embodiment a method is provided, performed by a network efficiency node 100 in a wireless communications network for enabling increased data throughput to a UE 140. FIG. 2 shows a flowchart illustrating the method. The method comprises retrieving information A1 in a step S100 of UE 140 configuration data. The method comprises receiving A2 in a step S110 an indicator of a first channel capability from the UE 140. The method comprises determining A3 in a step S120 a first data transport unit size based on the received indicator of the first channel capability. The method comprises selecting A4 in a step S130 a second channel capability different than the received indicated first channel capability and limited based on the information of the UE 140 configuration data. The method comprises determining A5 in a step S140 a second data transport unit size based on the selected second channel capability. The method comprises transmitting A6 in a step S150 scheduling information to the UE 140 to use the second data transport unit size, thereby enabling increased data throughput.

UE configuration data may be stored in the UE database 150. The UE configuration data may be captured at a hand over from a neighboring cell, or at activation of a UE 140. The UE configuration data may include information about how many antennas a UE has, as well as other information related to how the UE 140 is configured and its capabilities, e.g. the number of antennas may indicate how many channels that may be supported. The received indicator of the first channel capability may include a UE 140 measured signal quality and the UE 140 may have determined based on the measured signal quality, a suitable channel capability for data transmission.

Based on the indicated first channel capability, it may be determined which is an appropriate first data transport unit size. According to the UE configuration information, the UE 140 may have a different channel capability. The indicated first channel capability may be overridden by selection of a second channel capability. That second channel capability may then be the basis for determination of a second data transport unit size. Scheduling information about using the second transport unit size may be transmitted to the UE 140. By overriding the UEs 140 first channel capability by a second channel capability, based on the knowledge that the UE 140 is configured for a different capability, and potentially may be able to utilize that different channel capability, it may be possible to increase the data throughput to the UE 140.

Non limiting examples of a base station 130 may be, a base station in a GSM network (Global System for Mobile Communications), a base station in a UMTS network (Universal Mobile Telecommunications System), an eNB in a LTE network, a WiFi access point in a WLAN (Wireless Local Area Network), a base station in a WiMAX network.

A UE 140, may be a mobile phone, a smart phone, a PDA (Portable Digital Assistant), a laptop computer, a stationary computer, a tablet computer, a data access device suitable for connection with a computer such as a USB modem (Universal Serial Bus) and similar, not limiting to similar devices suitable for communication.

Figure 3:
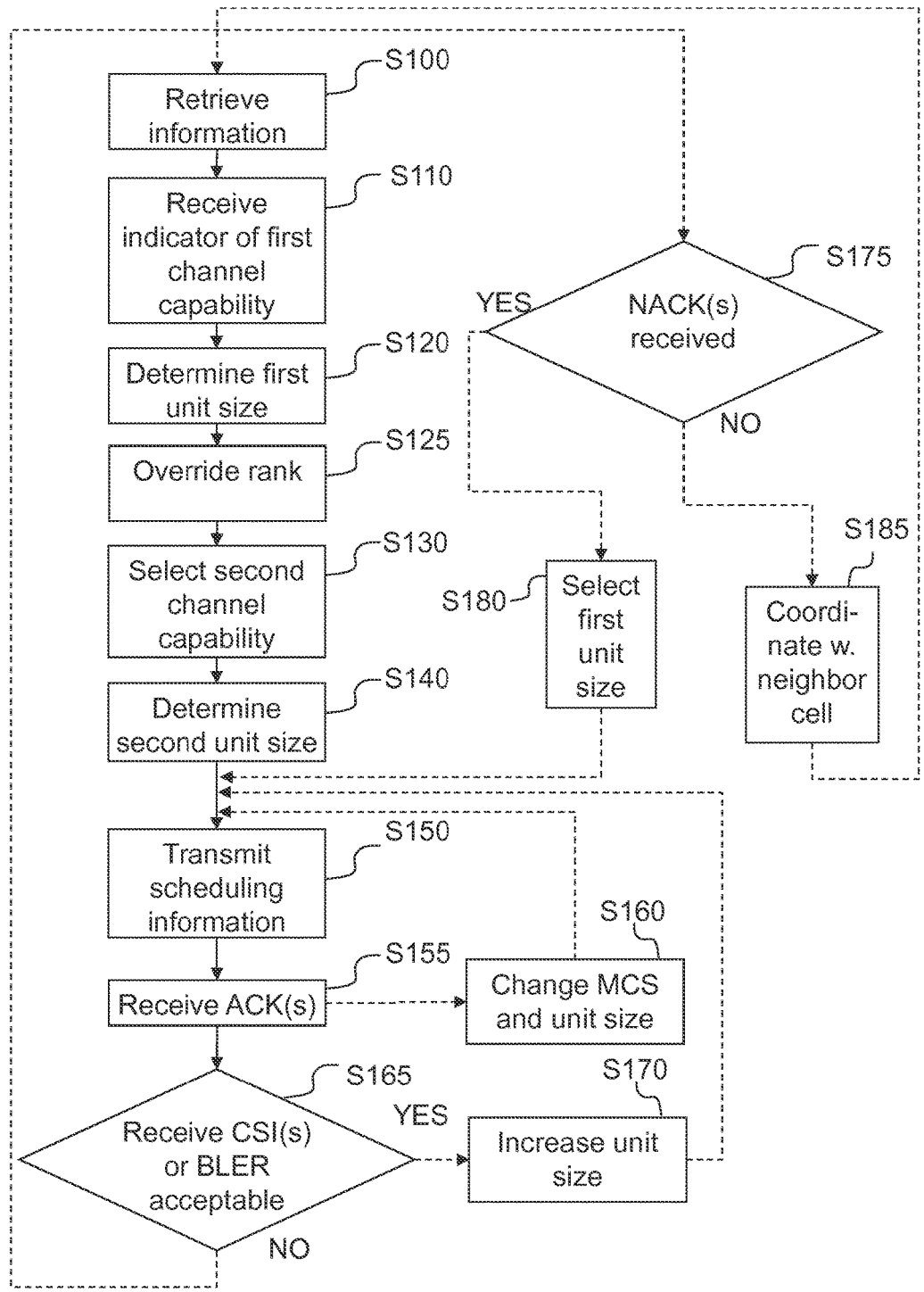
FIG. 3 is a flow chart illustrating a procedure in a network efficiency node, according to further possible embodiments.

Now looking at FIG. 3. FIG. 3 is a flow chart illustrating a procedure in a network efficiency node 100, according to further possible embodiments. Procedure steps in FIG. 2 and FIG. 3 with the same reference numbers indicates similar activities or actions.

Retrieval of configuration information about the UE 140 may be carried out in a few different ways. A few examples: If the UE 140 is turned on in the cell, it may register to the network, and as part of the registration provide its configuration. If the UE 140 is coming from a neighboring cell, the configuration information about the UE 140, may be provided as part of the hand over procedure. The UE 140 configuration may be acquired at connection set-up.

In an embodiment of the solution, the indicator of the first channel capability may comprise at least one of: Reference Signal Received Power (RSRP), Hybrid Automatic Repeat Request (HARQ) feedback, Channel Quality Information (CQI), Precoding Matrix Indicator (PMI), and Rank Indicator (RI). When the method is performed in a LTE-network, the data transport unit size may correspond to a Transport Block Size (TBS).

The data transport unit size may in different types of networks correspond particular terms used in the various networks.

In an embodiment of the solution, the rank given by the Rank Indicator (RI) indicated by the UE (140), may be overridden S125 with a second rank, where the second rank is different than the first rank. An example according to the following. The UE configuration data indicates that the UE has two antennas and thereby should be capable of communication over two channels. The UE 140 may have indicated a channel capability of rank one, i.e. communication via one channel. However, this may be overridden by a rank two, because the UE is configured for supporting rank two and potentially a higher data throughput may be achieved by transmission over two channels. Examples of reasons for of the rank indicated by the UE 140 may be, pessimistic or robust channel quality estimation due to measurement error, not limiting other reasons for overriding the rank.

Another example is where the rank indicated by the UE 140 is rank two, and may be overridden by rank one. In this example the UE 140 may be optimistic or other reasons for overriding the first rank with a second rank which is lower.

In this description the term override is used, but override may also be denoted omit, overrule, overturn, supersede, etc, not limiting other similar terms to be used.

In an embodiment of the solution a Modulation and Coding Scheme (MCS) may be selected such that the second data transport unit size is different than the first data transport unit size. Theoretically the data transport unit size could be doubled, if a first rank is rank one and is override by a second rank which is rank two. In a case where the indicated first rank is one and the override second rank is two, a more conservative approach may be to select a MCS which provides a second data transport unit size which is slightly larger than the first data transport unit size. A similar procedure may be applied when overriding a rank two with rank one.

In an embodiment of the solution a predetermined number of Acknowledgment (ACK) may be received S155 from the UE 140, where the ACK's may be indicating successful reception of data. The ACK's may be indicating that the second data transport unit size was useful and not over optimistic. As a subsequent step, the Modulation and Coding Scheme (MCS) may be changed S160, such that the data transport unit size becomes larger than the second data transport unit size. The Modulation and Coding Scheme (MCS) may also be changed, such that the data transport unit size becomes smaller than the second data transport unit size.

By sequentially receiving ACK's from the UE 140 and gradually changing the Modulation and Coding Scheme (MCS) in combination with the second rank, such that the data transport unit size gradually changes, it is possible to optimize the data throughput.

In an embodiment of the solution the Modulation and Coding Scheme (MCS) in combination with the second rank may be changed such that a Block Error Rate (BLER) value is maintained within a determined interval. An example is, as long as the BLER is within the determined interval, the data transport unit size may be gradually increased. If the BLER is outside the determined interval, the data transport unit size may be gradually decreased, until within the acceptable BLER interval. If the data transport unit size is gradually decreased, the solution may perform comparison and evaluate if the second rank is beneficial.

In an embodiment of the solution the data transport unit size may be increased based on, subsequent received S165 Channel Quality Information (CQI) determined as acceptable. The data transport unit size may also be increased based on that the BLER value is maintained within a determined interval. The data transport unit size may be increased in subsequent steps, in order to transmit as much data as possible to the UE 140, adopting the increase S170 size of the steps such that the CSI or BLER not becomes completely unacceptable between two steps.

In an embodiment of the solution a second data transport unit size may be determined which is larger than the first data transport unit size when an indicator of channel quality is above a predetermined threshold by overriding the first rank. When the indicator of channel quality is below a predetermined threshold, a second data transport unit size may be determined which is smaller than the first data transport unit size by overriding the first rank.

The channel quality may be measured in different ways, or indicated by different parameters. A few non-limiting examples are: Signal to Noise plus Interference (SNIR), Reference Signal Received Power (RSRP), Reference Signal Received Quality (RSRQ), or similar quality parameters.

In an embodiment of the solution, a number of Not Acknowledges (NACK) received S175 from the UE 140 over a determined time period may indicate failure reception of data from the UE 140. Then the first data transport unit size based on the received indicator of the first channel capability may be selected S180. Further, an instruction may be transmitted to the UE 140 to use the first data transport unit size.

There are situations when the data transport unit size may need to be decreased. A non-limiting example is that the increase of data transport unit size may be too aggressive or optimistic. Another example is that the received indicator of the first channel capability was correct, e.g. because of correct measurements of the channel capability by the UE 140. In a situation when a second channel capability is selected, with a data transport unit size which is larger than the first determined data transport unit size, the larger data transport unit size may cause the UE 140 to respond with a NACK indicating failure in the data reception. If a NACK is received, that may indicate that the first data transport unit size based on the received indicator of the first channel capability should be selected. If a number of NACK's during a determined time period is received, that may indicate that the first data transport unit size based on the received indicator of the first channel capability should be selected.

In an embodiment of the solution, the method may be performed in coordination S185 with reduction of transmission power in a neighboring cell. An example is where normal transmission power is used in two neighboring cells. Two UE's 140 may have similar need pattern of data. However, if the first of the two UE's 140 starts to download a large file, the transmission power in the neighboring cell to the second UE 140 may interfere with the instantaneous increased bandwidth of the first UE 140 downloading the large file. By temporarily muting the neighboring cell, by reducing the transmission power from a base station 130, the rank reported by the first UE 140 successfully may be overridden.

In an embodiment of the solution the second data transport unit size may be determined based on the reduction of the of transmission power in the neighboring cell. The increase of data transport unit size may be depending on the reduction of the transmission power. By a determined reduction of the transmission power in one cell, the level of interference in the neighboring cell may be reduced to a level, which tolerates a certain increase of the data transport unit size.

A non limiting example illustrating embodiments in a LTE-network scenario may be described according to the following. In a first step an eNB, such as the base station 130, may receive a CSI from the UE, such as the UE 140. This CSI, in addition to HARQ feedback (Hybrid Automatic Repeat reQuest), may both be used to perform link adaptation, i.e. selecting the TBS, meaning the number of bits to transmit to the UE and the allocation size in terms of PRB (Physical Resource Blocks). In this example, let TBS1 represent the TBS obtained when the eNB uses the CSI, including the rank, reported by the UE. For the sake of illustration, assume that a decision was to allocate 20 PRBs to that UE with an MCS of 19. In this example that would result in a TBS of 9912 bits.

In case the reported rank was equal to two, the eNB may not attempt any override. Of course override may be possible to attempt if rank one would be more beneficial than rank two.

Further according to this example—In a second step, in case the UE reported rank one, the eNB may override the rank one reported by the UE by using rank two and adjust the MCS accordingly. Using the same number of PRBs from the first step, the link adaptation algorithm has the task to choose a TBS2 that is larger than TBS1. In order to not be very aggressive, the eNB selects the smallest TBS that is still larger than TBS1.

Using the example above, the goal is to find TBS2 larger than 9112 bits. Now since rank two is used, two code-words of equal size are transmitted. This means that a codeword should be larger than 9112/2=4956 bits. Assuming 20 PRBs are used, the smallest TBS that is larger than 4956 bits is equal to 5160 bits and requires an MCS of 12. This means that TBS2=10320 bits. This way, the goal of the rank override was achieved through having a larger TBS when using rank two, compared to when using rank one, while using the most possible robust yet high enough MCS.

In a third step, the eNB will inform the UE of the rank and modulation and coding scheme to use.

In a fourth step, in this example, having done rank override and instructed the UE to use rank two and the updated MCS, the eNB needs to make sure that its choice of rank override is feasible, otherwise it has to fall back to the rank reported by the UE. This may be done by using the updated rank, potentially with adjusted MCS based on e.g. outer loop, for a number of transmissions and potentially checking at least one of the following two aspects: is the UE able to maintain its BLER target, and/or did outer loop perform too many down adjustments such that the TBS2 is now smaller than what TBS1 can achieve. In case the UE is maintaining its BLER target and its TBS2 is larger than what TBS1 can support, the eNB keeps using rank 2. The eNB can even exploit the continuous/new CSI sent by the UE to let the outer loop converge faster if desired. That might be useful in case TBS2 was not aggressive enough, e.g. due to large gains from muting not captured by the UE's CSI. This is just an illustrative example of how the solution may be used in a network access scenario and not limiting other examples of how the solution may be used.

In a case where the indicator of the first channel capability, reported by the UE 140, indicates that the UE 140 has reported the highest rank the UE 140 supports, the network efficiency node 100 may not attempt any override. I.e. if rank two is indicated and the UE 140 has two antennas, the network efficiency node 100 may not override with a higher rank.

Figure 4:
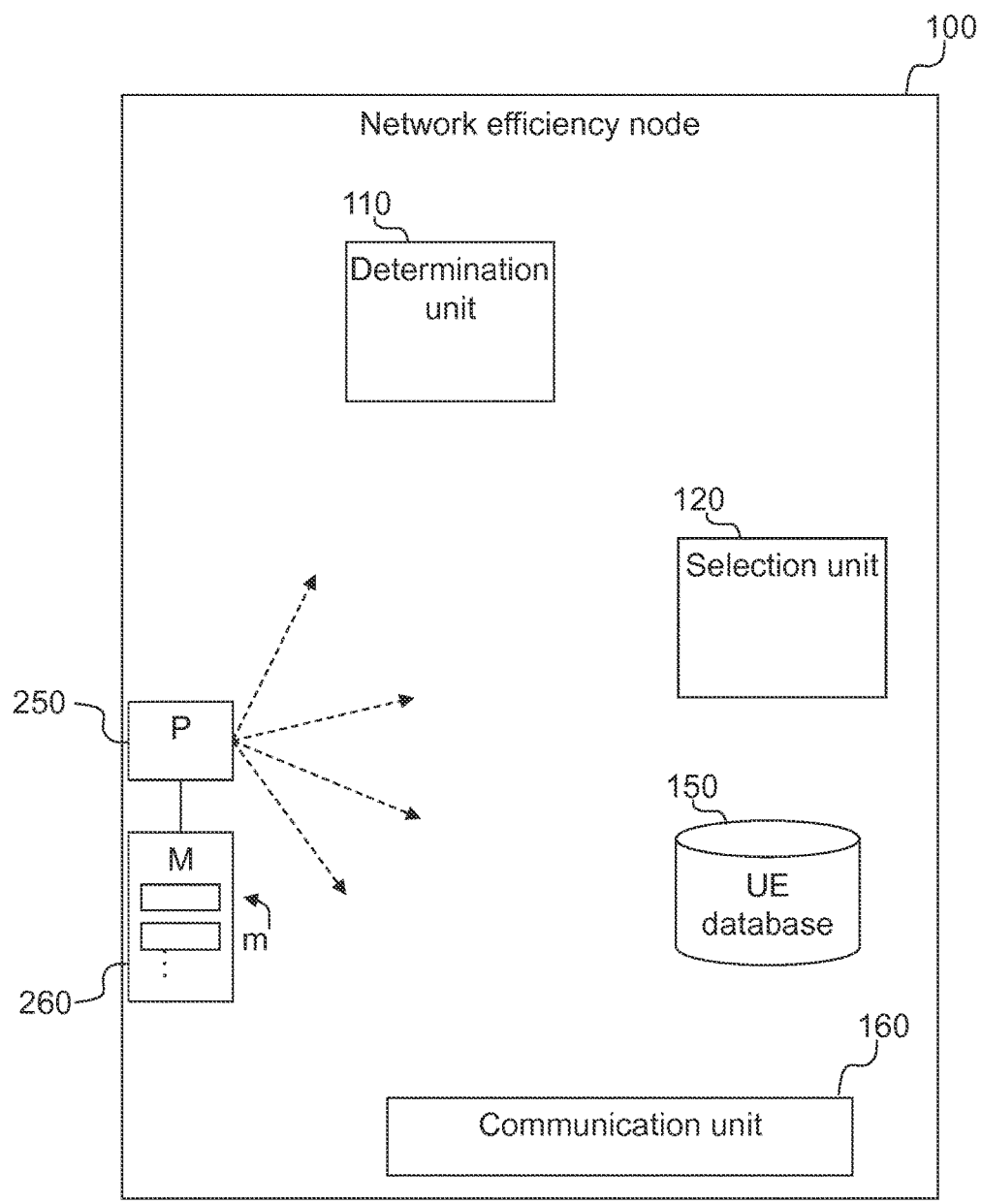
FIG. 4 illustrates further embodiments of a network efficiency node.

Now looking at FIG. 4. FIG. 4 illustrates further embodiments of a network efficiency node. The figure shows the previously mentioned determination unit 110, selection unit 120, UE database 150, communication unit 160 and a processor 250 for processing computer program and a memory for storing computer program.

According to an embodiment, the network efficiency node 100 is arranged in a wireless communications network for enabling increased data throughput to a UE 140. The node is configured to retrieve information of UE configuration data from an UE database 150. A communication unit 160 is configured to receive an indicator of a first channel capability from the UE 140. A determination unit 110 is configured to determine a first data transport unit size based on the received indicator of the first channel capability. A selection unit 120 is configured to select a second channel capability different than the received indicated first channel capability and limited based on the information of the UE configuration data. The determination unit 110 is configured to determine a second data transport unit size based on the selected second channel capability. The communication unit 160 is configured to transmit scheduling information to the UE 140 to use the second data transport unit size, thereby enabling increased data throughput.

In an embodiment, the indicator of the first channel capability received by the network efficiency node 100 may comprise at least one of: Reference Signal Received Power (RSRP), Hybrid Automatic Repeat Request (HARQ) feedback, Channel Quality Information (CQI), Precoding Matrix Indicator (PMI), and Rank Indicator (RI). The data transport unit size which may be determined by the signal capability may be in a LTE-network a Transport Block Size (TBS).

In an embodiment, the network efficiency node 100 may be arranged to override a first rank of the Rank Indicator (RI), indicated by the UE 140, with a second rank, where the second rank may be different than the first rank indicated by the UE 140.

In an embodiment, network efficiency node 100 may be arranged to select a Modulation and Coding Scheme (MCS) such that the second data transport unit size may be different than the first data transport unit size.

In an embodiment, network efficiency node 100 may be arranged to receive a predetermined number of Acknowledgment (ACK), or ACK-messages from the UE 140. The ACKs may indicate successful reception of data. The network efficiency node 100 may further be arranged to change the Modulation and Coding Scheme (MCS) in combination with the second rank, such that the data transport unit size becomes different than the second data transport unit size.

In an embodiment, network efficiency node 100 may be arranged to change the Modulation and Coding Scheme (MCS) in combination with the second rank, such that a Block Error Rate (BLER) value is maintained within a determined interval.

In an embodiment, network efficiency node 100 may be arranged to increase the data transport unit size based on subsequent received Channel State Information (CSI) determined as acceptable, and/or the network efficiency node 100 may be arranged to increase the data transport unit size based on the Block Error Rate (BLER) value maintained within a determined interval.

In an embodiment, network efficiency node 100 may be arranged to determine a second data transport unit size which is larger than the first data transport unit size, when an indicator of channel quality is above a predetermined threshold by overriding the first rank. The network efficiency node 100 may also be arranged to determine a second data transport unit size which is smaller than the first data transport unit size, when the indicator of channel quality is below a predetermined threshold by overriding the first rank.

In an embodiment, network efficiency node 100 may be arranged to receive a number of Not Acknowledge (NACK) from the UE 140 over a determined time period indicating failure reception of data from the UE 140. When NACKs are received the first data transport unit size based on the received indicator of the first channel capability may be selected, and the node may be arranged to transmit an instruction to the UE 140 to use the first data transport unit size.

Figure 5:
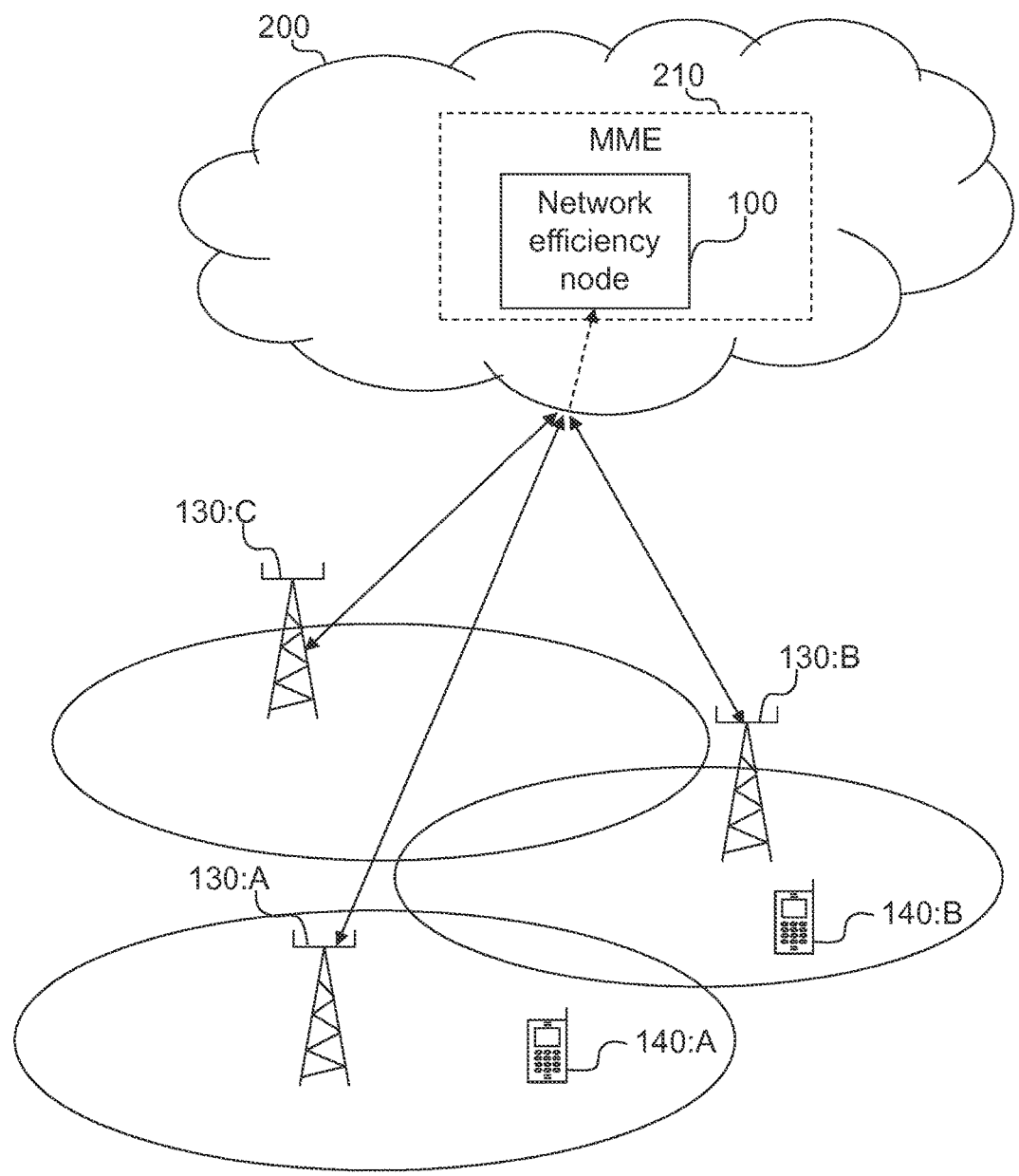
FIG. 5 is a block diagram illustrating the solution in a network scenario, according to further possible embodiments.

FIG. 5 shows a block diagram illustrating the solution in a network scenario. In an embodiment, network efficiency node 100 may be arranged to operate in coordination with reduction of transmission power in a neighboring cell.

In an embodiment, network efficiency node 100 may be arranged to determine the second data transport unit size dependent on the reduction of the of transmission power in the neighboring cell.

An illustrating example, not limiting the solution from being used in other ways, may be a scenario where UE 140:A and UE 140:B are registered in different cells to respective base station 130:A and base station 130:B. The both UEs 140 may be receiving the similar amount of data in a first step. In a second step one of the UEs, for example the UE 140:A would benefit of a temporarily increase of the bandwidth. The UE 140:A may for example request to download a large e-mail, a photo, a movie, or any other kind of bandwidth consuming data. To serve the UE 140:A with the necessary bandwidth, the base station 130:B may reduce the transmission power, for example to UE 140:B. Thereby may less interference affect the transmission from the base station 130:A to the UE 140:A.

FIG. 5 is further showing a centralized network function 200. The centralized network function 200 may be an operator's network management center, or a cloud based type of service, or a core network node including centralized digital units as well as network management functions. As the figure shows, the network efficiency node 100 may be comprised by a Mobility Management Entity 210 (MME), or just in connection with a MME 210. The MME 210 is just an example. Other management nodes may as well be used, as preferred by the person skilled in the art.

FIG. 4 that shows the network efficiency node 100 described above may be implemented, by means of program modules of a computer program comprising code means which, when run by processor "P" 250 causes the network efficiency node 100 to perform the above-described actions. The processor P 250 may comprise a single Central Processing Unit (CPU), or could comprise two or more processing units. For example, the processor P 250 may include general purpose microprocessors, instruction set processors and/or related chips sets and/or special purpose microprocessors such as Application Specific Integrated Circuits (ASICs). The processor P 250 may also comprise a storage for caching purposes.

The computer program may be carried by a computer program product "M" 260 in the Network efficiency node 100, shown in FIG. 1, 4, 5 et al, in the form of memories having a computer readable medium and being connected to the processor P. The computer program product M 260 or memory thus comprises a computer readable medium on which the computer program is stored e.g. in the form of computer program modules "m". For example, the memory M 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the network efficiency node 100.

Figure 6:
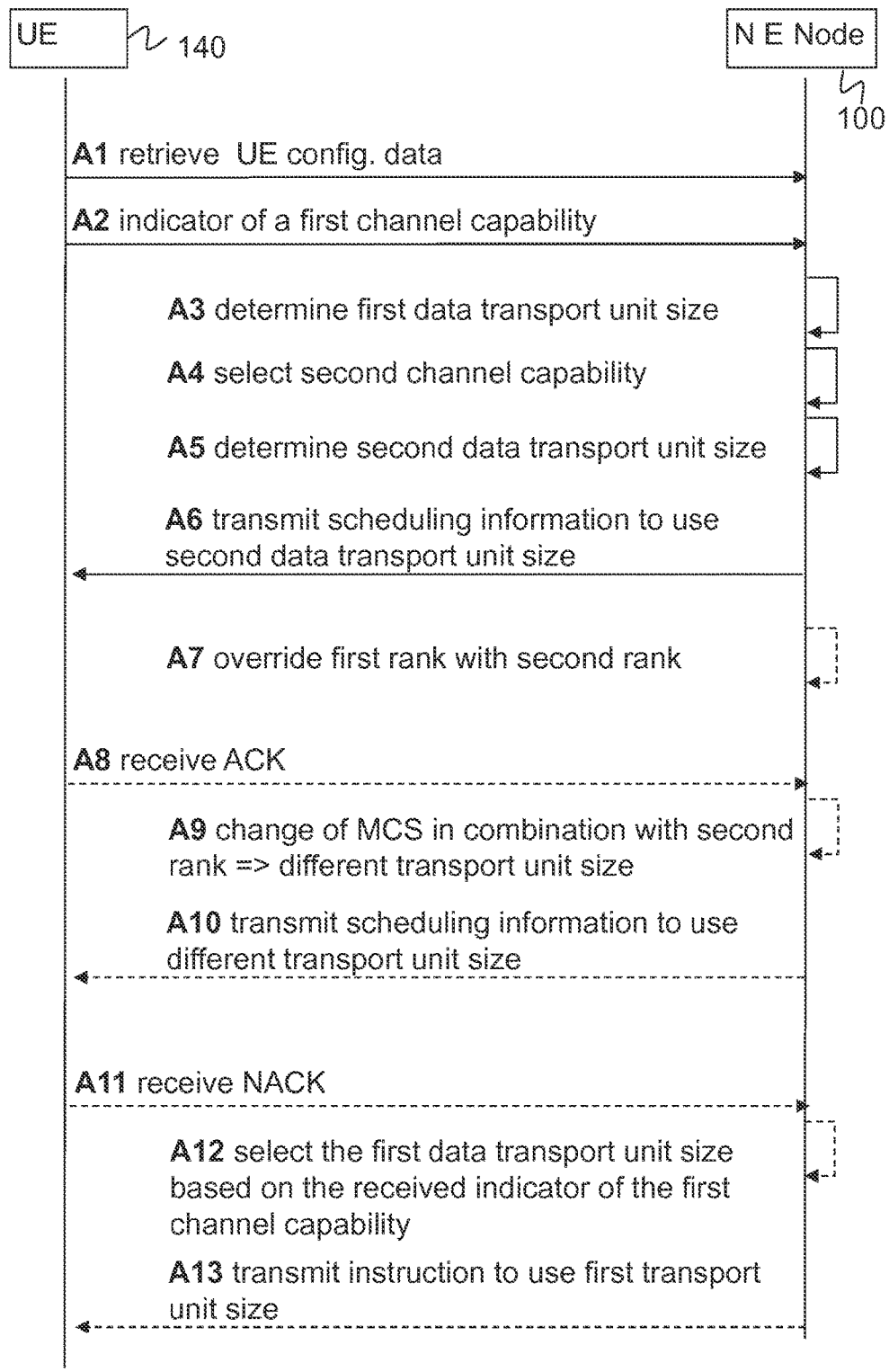
FIG. 6 is a signaling diagram illustrating an example of when the solution is used, according to possible embodiments.

FIG. 6 shows a signaling diagram, which illustrates examples of internal actions within a network efficiency node 100, and/or communication and messages between a network efficiency node 100 and a UE 140.

In an embodiment information may be retrieved in action A1 of UE 140 configuration data. In action A2 an indicator of a first channel capability may be received from the UE 140. In action A3 a first data transport unit size may be determined based on the received indicator of the first channel capability. In action A4 a second channel capability different than the received indicated first channel capability may be selected and limited based on the information of the UE 140 configuration data. In action A5 a second data transport unit size may be determined based on the selected second channel capability.

In action A6 scheduling information may be transmitted to the UE 140 to use the second data transport unit size. In action A7 the first rank may be override with a second rank.

In action A8 the network efficiency node 100 may receive "ACK" from the UE 140 confirming successful reception of data. In A9 the MCS (Modulation and Coding Schema) may be changed, such that the MCS in combination with the second rank provides a different transport unit size. In action A10 the scheduling information may be transmitted to the UE 140 to use the different transport unit size.

In action A11 a "NACK" may be received from the UE 140, indicating unsuccessful reception of data. In action A12 the first transport unit size may be selected by the network efficiency node 100, based on the received indicator of the first channel capability. In action A13 an instruction may be transmitted use the first transport unit size from the network efficiency node 100 to the UE140.

While the solution has been described with reference to specific exemplary embodiments, the description is generally only intended to illustrate the inventive concept and should not be taken as limiting the scope of the solution. For example, the terms "network efficiency node", "data transport unit size" and "override" have been used throughout this description, although any other corresponding nodes, functions, and/or parameters could also be used having the features and characteristics described here. The solution is defined by the appended claims.

The invention claimed is:

1. A method performed by a network efficiency node in a wireless communications network for enabling increased data throughput to a User Equipment, UE, the method comprising:
   retrieving information of UE configuration data, said UE configuration data including a number of UE antennas with which the UE is configured;
   receiving an indicator of a first channel capability from the UE;
   determining a first data transport unit size based on the received indicator of the first channel capability;
   determining a second channel capability of the UE, different than the received indicated first channel capability, based on the number of UE antennas with which the UE is configured;
   overriding the first channel capability received from the UE, and selecting the second channel capability of the UE;
   determining a second data transport unit size based on the selected second channel capability; and
   transmitting scheduling information to the UE to use the second data transport unit size, thereby enabling increased data throughput.

2. The method according to claim 1, wherein the indicator of the first channel capability comprises a Rank Indictor (RI) and at least one of:
   Reference Signal Received Power (RSRP), Hybrid Automatic Repeat Request (HARQ) feedback, Channel Quality Information (CQI), and Precoding Matrix Indicator (PMI), wherein
   The data transport unit size determined by the second channel capability is in a LTE-network a Transport Block Size (TBS).

3. The method according to claim 2, wherein the step of overriding the first channel capability received from the UE includes:
   overriding a first rank of the Rank Indicator (RI), indicated by the UE, with a second rank, the second rank different than the first rank indicated by the UE.

4. The method according to claim 3, wherein the step of determining a second data transport unit size includes:

determining a second data transport unit size which is larger than the first data transport unit size, when an indicator of channel quality is above a predetermined threshold by overriding the first rank, and determining a second data transport unit size which is smaller than the first data transport unit size, when the indicator of channel quality is below the predetermined threshold by overriding the first rank.

5. The method according to any of claim 1, wherein a Modulation and Coding Scheme (MCS) is selected such that the second data transport unit size is different than the first data transport unit size.

6. The method according to claim 1, comprising receiving a predetermined number of Acknowledgments (ACK) from the UE indicating successful reception of data, wherein the Modulation and Coding Scheme (MCS) is changed, such that the data transport unit size becomes different than the second data transport unit size.

7. The method according to claim 1, wherein the Modulation and Coding Scheme (MCS) is changed such that a Block Error Rate (BLER) value is maintained within a determined interval.

8. The method according to any of claim 1, wherein the data transport unit size is increased based on, subsequent received Channel State Information (CSI) determined as acceptable, or the Block Error Rate (BLER) value is maintained within a determined interval.

9. The method according to any of claim 1, further comprising, before the step of determining a second channel capability of the UE, the steps of:

selecting the first data transport unit size based on the received indicator of the first channel capability;

transmitting an instruction to the UE to use the first data transport unit size; and receiving a number of Not Acknowledges (NACK) from the UE over a determined time period indicating reception failure of data from the UE.

10. The method according to claim 1, wherein the method is performed in coordination with reduction of transmission power in a neighboring cell.

11. The method according to claim 1, wherein the determination of the second data transport unit size is dependent on the reduction of the of transmission power in a neighbouring cell.

12. A network efficiency node in a wireless communications network for enabling increased data throughput to a User Equipment, UE, the node comprising:

at least one processor; and a memory containing instructions that, when executed by the processor, cause the network efficiency node to retrieve information of UE configuration data from a UE database, said UE configuration data including a number of UE antennas with which the UE is configured, wherein the network efficiency node is further caused to implement:

communication circuitry configured to receive an indicator of a first channel capability from the UE;

determination circuitry configured to:

determine a first data transport unit size based on the received indicator of the first channel capability, and determine a second channel capability of the UE, different than the received indicated first channel capability, based on the number of UE antennas with which the UE is configured;

selection circuitry configured to override the first channel capability received from the UE, and to select the second channel capability of the UE;

the determination circuitry configured to determine a second data transport unit size based on the selected second channel capability, and the communication circuitry configured to transmit scheduling information to the UE to use the second data transport unit size, thereby enabling increased data throughput.

13. The node according to claim 12, wherein the indicator of the first channel capability comprises at least one of:

Reference Signal Received Power (RSRP), Hybrid Automatic Repeat Request (HARQ) feedback, Channel Quality Information (CQI), Precoding Matrix Indicator (PMI), and Rank Indicator (RI), wherein the data transport unit size determined by the second channel capability is in a LTE-network a Transport Block Size (TBS).

14. The node according to claim 13, wherein the selection circuitry is arranged to override a first rank of the Rank Indicator (RI), indicated by the UE, with a second rank, the second rank different than the first rank indicated by the UE.

15. The node according to claim 12, wherein the node is arranged to select a Modulation and Coding Scheme (MCS) such that the second data transport unit size is different than the first data transport unit size.

16. The node according to claim 12, wherein the node is arranged to receive a predetermined number of Acknowledgements (ACK) from the UE indicating successful reception of data, wherein the node is arranged to change the Modulation and Coding Scheme (MCS), such that the data transport unit size becomes different than the second data transport unit size.

17. The node according to claim 12, wherein the node is arranged to change the Modulation and Coding Scheme (MCS), such that a Block Error Rate (BLER) value is maintained within a determined interval.

18. The node according to claim 12, wherein the node is arranged to increase the data transport unit size is based on subsequent received Channel State Information (CSI) determined as acceptable, or the Block Error Rate (BLER) value maintained within a determined interval.

19. The node according to claim 12, wherein the determination circuitry is arranged to determine a second data transport unit size which is larger than the first data transport unit size, when an indicator of channel quality is above a predetermined threshold by overriding the first rank, and the determination circuitry is arranged to determine a second data transport unit size which is smaller than the first data transport unit size, when the indicator of channel quality is below the predetermined threshold by overriding the first rank.

20. The node according to claim 12, wherein:

the node is arranged to initially select the first data transport unit size based on the received indicator of the first channel capability, and to transmit an instruction to the UE to use the first data transport unit size, and the node is arranged to subsequently select the second data transport unit size when the node receives a number of Not Acknowledges (NACK) from the UE over a determined time period indicating reception failure of data from the UE.

21. The node according to claim 12, wherein the node is arranged to operate in coordination with reduction of transmission power in a neighbouring cell.

22. The node according to claim 12, wherein the node is arranged to determine the second data transport unit size dependent on the reduction of the of transmission power in a neighbouring cell.

23. A non-transitory computer-readable medium containing computer program code, which when run on a processor in a network efficiency node, causes the network efficiency node to perform a method of increasing data throughput to a User Equipment, UE, the method comprising:

retrieving information of UE configuration data, said UE configuration data including a number of UE antennas with which the UE is configured;

receiving an indicator of a first channel capability from the UE;

determining a first data transport unit size based on the received indicator of the first channel capability;

determining a second channel capability of the UE, different than the received indicated first channel capability, based on the number of UE antennas with which the UE is configured;

overriding the first channel capability received from the UE, and selecting the second channel capability of the UE;

determining a second data transport unit size based on the selected second channel capability; and transmitting scheduling information to the UE to use the second data transport unit size, thereby enabling increased data throughput.

* * * * *